United States Patent
Chiang et al.

(10) Patent No.: US 12,160,569 B2
(45) Date of Patent: Dec. 3, 2024

(54) METHOD AND APPARATUS OF CHROMA DIRECT MODE GENERATION FOR VIDEO CODING

(71) Applicant: MEDIATEK INC., Hsinchu (TW)

(72) Inventors: Man-Shu Chiang, Hsinchu (TW); Chih-Wei Hsu, Hsinchu (TW); Tzu-Der Chuang, Hsinchu (TW); Ching-Yeh Chen, Hsinchu (TW); Yu-Wen Huang, Hsinchu (TW); Shih-Ta Hsiang, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 330 days.

(21) Appl. No.: 17/609,707

(22) PCT Filed: May 6, 2020

(86) PCT No.: PCT/CN2020/088684
§ 371 (c)(1),
(2) Date: Nov. 8, 2021

(87) PCT Pub. No.: WO2020/228566
PCT Pub. Date: Nov. 19, 2020

(65) Prior Publication Data
US 2022/0224891 A1 Jul. 14, 2022

Related U.S. Application Data

(60) Provisional application No. 62/845,962, filed on May 10, 2019.

(51) Int. Cl.
*H04N 19/11* (2014.01)
*H04N 19/159* (2014.01)
(Continued)

(52) U.S. Cl.
CPC ........... *H04N 19/11* (2014.11); *H04N 19/159* (2014.11); *H04N 19/176* (2014.11); *H04N 19/186* (2014.11)

(58) Field of Classification Search
None
See application file for complete search history.

(56) References Cited

U.S. PATENT DOCUMENTS

| | | |
|---|---|---|
| 8,509,304 B2 | 8/2013 | Lee et al. |
| 10,567,759 B2 | 2/2020 | Seregin et al. |
| (Continued) | | |

FOREIGN PATENT DOCUMENTS

| | | |
|---|---|---|
| CN | 101494782 B | 3/2014 |
| CN | 105611304 A | 5/2016 |
| (Continued) | | |

OTHER PUBLICATIONS

International Search Report and Written Opinion dated Jul. 29, 2020, issued in application No. PCT/CN2020/088684.
(Continued)

*Primary Examiner* — Clifford Hilaire
(74) *Attorney, Agent, or Firm* — McClure, Qualey & Rodack, LLP

(57) ABSTRACT

A method and apparatus of prediction for video coding are disclosed. According to one method, a luma Intra prediction mode is determined for a corresponding luma block collocated with the current chroma block, where a predefined mode is assigned to the luma Intra prediction mode when the corresponding luma block collocated with the current chroma block satisfies one or more conditions. A chroma Intra prediction mode is determined for the current chroma block according to the luma Intra prediction mode. The current chroma block is then encoded or decoded according to the chroma Intra prediction mode. According to another
(Continued)

method, a predefined mode is assigned to Intra prediction mode for the current block when the current block satisfies one or more conditions. The current block is then encoded or decoded according to the Intra prediction mode.

5 Claims, 4 Drawing Sheets

(51) Int. Cl.
    *H04N 19/176*     (2014.01)
    *H04N 19/186*     (2014.01)

(56) References Cited

U.S. PATENT DOCUMENTS

| | | |
|---|---|---|
| 10,841,612 B2 | 11/2020 | Kim et al. |
| 2017/0324963 A1 | 11/2017 | Lee |
| 2017/0332084 A1 | 11/2017 | Seregin et al. |
| 2017/0374369 A1 | 12/2017 | Chuang et al. |
| 2018/0295384 A1* | 10/2018 | Son .................. H04N 19/182 |
| 2020/0045322 A1* | 2/2020 | Ye .................... H04N 19/186 |
| 2020/0314419 A1* | 10/2020 | Wang ................. H04N 19/70 |
| 2021/0352273 A1* | 11/2021 | Lim ................... H04N 19/176 |
| 2022/0038698 A1* | 2/2022 | Koo .................. H04N 19/124 |

FOREIGN PATENT DOCUMENTS

| | | |
|---|---|---|
| CN | 108781282 A | 11/2018 |
| WO | 2017/206805 A1 | 12/2017 |

OTHER PUBLICATIONS

Zhang, L., et al.; "CE3-related: Modified chroma derived mode;" Joint Video Experts Team (JVET) of ITU-T SG 16 WP 3 and ISO/IEC JTC 1/SC 29/WG 11; Oct. 2018; pp. 1-3.

Rath, G., et al.; "CE3-related: DM-dependent chroma intra prediction modes;" Joint Video Experts Team (JVET) of ITU-T SG 16 WP 3 and ISO/IEC JTC 1/SC 29/WG 11; Jan. 2019; pp. 1-5.

Chinese language office action dated Aug. 12, 2021, issued in application No. TW 109115203.

Extended European Search report dated Dec. 9, 2022, issued in application No. EP 20806573.0.

Chiang, M., et al.; "CE3-related: Chroma DM derivation for IBC and PCM;" Joint Video Experts Team (JVET) of ITU-T SG 16 WP 3 and ISO/IEC JTC 1/SC 29/WG 11; Jul. 2019; pp. 1-3.

Pham Van, L., et al.; "Non-CE8: Intra prediction mode derivation for DM chroma block with corresponding IBC/PCM luma;" Joint Video Experts Team (JVET) of ITU-T SG 16 WP 3 and ISO/IEC JTC 1/SC 29/WG 11; Jul. 2019; pp. 1-2.

Van Der Auwera, G.; "Report of BoG on intra prediction and mode coding;" Joint Video Experts Team (JVET) of ITU-T SG 16 WP 3 and ISO/IEC JTC 1/SC 29/WG 11; Jul. 2019; pp. 1-39.

Chiang, M., et al.; "CE8-related: Intra prediction mode for BDPCM;" Joint Video Experts Team (JVET) of ITU-T SG 16 WP 3 and ISO/IEC JTC 1/SC 29/WG 11; Jul. 2019; pp. 1-5.

Chen, J., et al.; "Algorithm description for Versatile Video Coding and Test Model 4 (VTM 4);" Joint Video Experts Team (JVET) of ITU-T SG 16 WP 3 and ISO/IEC JTC 1/SC 29/WG 11; Jan. 2019; pp. 1-62.

Abdoli, M., et al.; "CE8: BDPCM with horizontal/vertical predictor and independently decodable areas (test 8.3.1b);" Joint Video Experts Team (JVET) of ITU-T SG 16 WP 3 and ISO/IEC JTC 1/SC 29/WG 11; Jan. 2019; pp. 1-7.

Choi N., et al.; "CE3-related: Chroma DM modification;" Joint Video Experts Team (JVET) of ITU-T SG 16 WP 3 and ISO/IEC JTC 1/SC 29/WG 11; Oct. 2018; pp. 1-6.

Bross B., et al.; "Versatile Video Coding (Draft 5);" Joint Video Experts Team (JVET) of ITU-T SG 16 WP 3 and ISO/IEC JTC 1/SC 29/WG 11; Mar. 2019; pp. 1-356.

\* cited by examiner

METHOD AND APPARATUS OF CHROMA DIRECT MODE GENERATION FOR VIDEO CODING

CROSS REFERENCE TO RELATED APPLICATIONS

The present invention claims priority to U.S. Provisional Patent Application, Ser. No. 62/845,962, filed on May 10, 2019. The U.S. Provisional Patent Application is hereby incorporated by reference in its entirety.

FIELD OF THE INVENTION

The present invention relates to Inter/Intra prediction for video coding of color video data. In particular, the present invention relates to process of chroma Intra prediction mode utilizing luma Intra coding information.

BACKGROUND AND RELATED ART

High-Efficiency Video Coding (HEVC) is a new international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block, and each CU can be recursively split into four smaller CUs until the predefined minimum size is reached. Each picture can be partitioned into multiple CTUs (Coding Tree Units) and each CTU is partitioned one or more CUs. For color video data, each CU may comprise multiple Coding Blocks (CBs) corresponding to multiple color components. Each CU contains one or multiple prediction units (PUs). For color video data, each PU may comprise multiple Prediction Blocks (PBs) corresponding to multiple color components. To achieve the best coding efficiency of hybrid coding architecture in HEVC, there are two kinds of prediction modes (i.e., Intra prediction and Inter prediction) for each PU. For Intra prediction modes, the spatial neighboring reconstructed pixels can be used to generate the directional predictions.

After the development of HEVC standard, another merging video coding standard, named as Versatile Video Coding (VVC), is being developed under Joint Video Exploration Team (JVET) of ITU-T SG 16 WP 3 and ISO/IEC JTC 1/SC 29/WG 11. Various new coding tools along with some existing coding tools have been evaluated for VVC.

Some relevant coding tools for HEVC/VVC are reviewed as follows.

Inter Mode

When a CU/PU is coded in Inter AMVP (Advanced Motion Vector Prediction) mode, motion-compensated prediction is performed with transmitted motion vector differences (MVDs) that can be used together with Motion Vector Predictors (MVPs) for deriving motion vectors (MVs). To decide MVP in Inter AMVP mode, the advanced motion vector prediction (AMVP) scheme is used to select a motion vector predictor among an AMVP candidate set including two spatial MVPs and one temporal MVP. Therefore, in the AMVP mode, MVP index for MVP and the corresponding MVDs are required to be encoded and transmitted. In addition, the Inter prediction direction to specify the prediction directions among bi-prediction and uni-prediction (list 0 (L0) or list 1 (L1)), along with the reference frame index for each list should also be encoded and transmitted.

When a PU is coded in either Skip or Merge mode, no motion information is transmitted except for the Merge index of the selected candidate. That is because the Skip and Merge modes utilize motion inference of a candidate from a candidate list. For the Skip and Merge modes, the MV difference (MVD) between the underlying MV and the MV predictor is zero (i.e., MV=MVP+MVD=MVP)). Therefore, the motion information can be obtained from spatially neighboring blocks (spatial candidates) or a temporal block (temporal candidate) located in a co-located picture. The co-located picture is the first reference picture in list 0 or list 1, which is signaled in the slice header. In the case of a Skip PU, the residual signal is also omitted. To decide the Merge index for the Skip and Merge modes, the Merge scheme is used to select a motion vector predictor among a Merge candidate set containing four spatial MVPs and one temporal MVP.

Intra Block Copy (IBC)/Current Picture Referencing

Motion estimation/compensation is a well-known key technology in hybrid video coding, which explores the pixel correlation between adjacent pictures. In a video sequence, the object movement between neighboring frames is small and the object movement can be modelled by two-dimensional translational motion. Accordingly, the patterns corresponding to objects or background in a frame are displaced to form corresponding objects in the subsequent frame or correlated with other patterns within the current frame. With the estimation of a displacement (e.g. using block matching techniques), the pattern can be mostly reproduced without the need to re-code the pattern. Similarly, block matching and copy has also been tried to allow selecting the reference block from within the same picture. It was observed to be not efficient when applying this concept to videos captured by a camera. Part of the reasons is that the textual pattern in a spatial neighboring area may be similar to the current coding block, but usually with some gradual changes over space. It is thus difficult for a block to find an exact match within the same picture of video captured by a camera. Therefore, the improvement in coding performance is limited.

However, the spatial correlation among pixels within the same picture is different for screen content. For typical video with text and graphics, there are usually repetitive patterns within the same picture. Hence, Intra (picture) block compensation has been observed to be very effective. A new prediction mode, i.e., the Intra block copy (IBC) mode or called current picture referencing (CPR), has been introduced for screen content coding to utilize this characteristic. In the CPR mode, a prediction unit (PU) is predicted from a previously reconstructed block within the same picture. Further, a displacement vector (called block vector or BV) is used to signal the relative displacement from the position of the current block to the position of the reference block. The prediction errors are then coded using transformation, quantization and entropy coding. An example of CPR compensation is illustrated in FIG. 1, where area 110 corresponds to a picture, a slice or a picture area to be coded. Blocks 120 and 130 correspond to two blocks to be coded. In this example, each block can find a corresponding block in the previous coded area in the current picture (i.e., 122 and 132 respectively). According to this technique, the reference samples correspond to the reconstructed samples of the current decoded picture prior to in-loop filter operations including both de-blocking and sample adaptive offset (SAO) filters in HEVC.

An early version of CPR was disclosed in JCTVC-M0350 (M. Budagavi, et al, "AHG8: Video coding using Intra motion compensation", Joint Collaborative Team on Video Coding (JCT-VC) of ITU-T SG 16 WP 3 and ISO/IEC JTC 1/SC 29/WG 11, 13th Meeting: Incheon, K R, 18-26 Apr. 2013, Document: JCTVC-M0350), which is submitted as a candidate technology for HEVC Range Extensions (RExt) development. In JCTVC-M0350, the CPR compensation was limited to be within a small local area and the search is limited to 1-D block vector for the block size of 2N×2N only. Later, a more advanced CPR method was developed during the standardization of HEVC SCC (screen content coding).

Intra block copy (IBC) is adopted in HEVC extensions on SCC and the emerging video coding standard, Versatile Video Coding (VVC). It is well known that it significantly improves the coding efficiency of screen content materials. Since IBC mode is implemented as a block level coding mode, block matching (BM) is performed at the encoder to find the optimal block vector (or motion vector) for each CU. Here, a block vector is used to indicate the displacement from the current block to a reference block, which is already reconstructed inside the current picture. The luma block vector of an IBC-coded CU is in integer precision. The chroma block vector is rounded to integer precision as well. When combined with AMVR, the IBC mode can switch between 1-pel and 4-pel motion vector precisions. An IBC-coded CU is treated as the third prediction mode other than Intra or Inter prediction modes. The IBC mode is applicable to the CUs with both width and height smaller than or equal to 64 luma samples.

At the encoder side, hash-based motion estimation is performed for IBC. The encoder performs RD (rate-distortion) check for blocks with either width or height no larger than 16 luma samples. For non-Merge mode, the block vector search is performed using hash-based search first. If hash search does not return a valid candidate, block matching based local search will be performed.

In the hash-based search, hash key matching (32-bit CRC) between the current block and a reference block is extended to all allowed block sizes. The hash key calculation for every position in the current picture is based on 4×4 sub-blocks. For the current block of a larger size, a hash key is determined to match that of the reference block when all the hash keys of all 4×4 sub-blocks match the hash keys in the corresponding reference locations. If hash keys of multiple reference blocks are found to match that of the current block, the block vector costs of each matched reference are calculated and the one with the minimum cost is selected.

In block matching search, for an example, the search range is set to cover both the previous and current CTUs. For another example, the search range is in the current CTU and one left CTU. For another example, the search range is set to be N samples to the left and on top of the current block within the current CTU. At the beginning of a CTU, the value of N is initialized to 128 if there is no temporal reference picture, and initialized to 64 if there is at least one temporal reference picture. A hash hit ratio is defined as the percentage of samples in the CTU that found a match using hash-based search. While encoding the current CTU, if the hash hit ratio is below 5%, N is reduced by half At the CU level, the IBC mode is signaled with a flag and it can be signaled as IBC AMVP mode or IBC Skip/Merge mode as follows:
  IBC Skip/Merge mode: a Merge candidate index is used to indicate which of the block vectors in the list from neighboring candidate IBC coded blocks is used to predict the current block. The Merge list consists of spatial, HMVP (History-based MVP), and pairwise candidates.

IBC AMVP mode: block vector difference is coded in the same way as a motion vector difference. The block vector prediction method uses two candidates as predictors, one from the left neighbor and one from the above neighbor (if IBC coded). When either neighbor is not available, a default block vector will be used as a predictor. A flag is signaled to indicate the block vector predictor index.

In this invention, the motion vectors (MVs), motion vector differences (MVDs), and motion vector predictors (MVPs) for IBC mode are named as BVs, BVDs, and BVPs, respectively.

Intra Mode Coding with 67 Intra Prediction Modes

To capture the arbitrary edge directions presented in natural video, the number of directional Intra modes in VTM4 is extended from 33, as used in HEVC, to 65. There are 67 Intra prediction modes including the 65 directional modes, and planar and DC modes as shown in FIG. 2, where the new directional modes not in HEVC are depicted as dashed lines in FIG. 2. The planar and DC modes remain the same. These denser directional Intra prediction modes apply for all block sizes and for both luma and chroma Intra predictions.

In VTM4 (J. Chen, et al., "Algorithm description for Versatile Video Coding and Test Model 4 (VTM 4)", Joint Video Experts Team (JVET) of ITU-T SG 16 WP 3 and ISO/IEC JTC 1/SC 29/WG 11, 13th Meeting: Marrakech, M A, 9-18 Jan. 2019, Document: JVET-M1002), several conventional angular Intra prediction modes are adaptively replaced with wide-angle Intra prediction modes for the non-square blocks. Wide angle Intra prediction is described in section 3.3.1.2 of VTM4.

In HEVC, every intra-coded block has a square shape and the length of each of its side is a power of 2. Thus, no division operations are required to generate an intra-predictor using DC mode. In VTM4, blocks can have a rectangular shape that necessitates the use of a division operation per block in the general case. To avoid division operations for DC prediction, only the longer side is used to compute the average for non-square blocks.

Intra Mode Coding

To keep the complexity of the most probable mode (MPM) list generation low, an Intra mode coding method with 6 MPMs is used by deriving the MPMs based on two available neighboring Intra modes. The following three aspects are considered to construct the MPM list:
Default Intra modes
Neighboring Intra modes
Derived Intra modes For neighbor Intra modes, two neighboring blocks, located at left (A) and above (B) of the current block are considered. The 6 MPM list generation process start with initializing default MPM list as follows:

Default 6 $MPM$ modes = {$A$, Planar (0) or DC (1),

Vertical (50), $HOR$ (18), $VER-4(46)$, $VER+4(54)$}.

In the above equation, the number in the parenthesis represents the Intra mode index of the corresponding Intra mode. For example, the Intra mode indexes for Planar and DC modes are 0 and 1 respectively. After the 6 MPM modes are updated, a pruning process is performed for two neighboring Intra modes. If the two neighboring modes are the same and the neighboring mode index is greater than DC (1) mode, 6 MPM modes are to include three default modes (A, Planar, DC) and three derived modes. The three derived modes are obtained by adding predefined offset values to the neighboring mode and performing the modular operation. Otherwise, if the two neighboring modes are different, two neighboring modes are assigned to first two 1MPM modes and the rest four MPM modes are derived from default modes and neighboring modes. During the 6-MPM list generation process, pruning is used to remove duplicated modes so that only unique modes can be included in the MPM list. For entropy coding of the 61 non-MPM modes, a Truncated Binary Code (TBC) is used. More details of the 6-MPM construction can be found in JVET-N0185 (B. Wang, et al., "CE3-related: A unified MPM list for intra mode coding", Joint Video Experts Team (JVET) of ITU-T SG 16 WP 3 and ISO/IEC JTC 1/SC 29/WG 11, 14th Meeting: Geneva, CH, 19-27 Mar. 2019, Document: JVET-N0185).

Chroma DM (Direct Mode)

Chroma DM (Direct Mode) is a mode to directly use the Intra prediction mode of the corresponding luma block associated with the current chroma block to be the intra prediction mode of the current chroma block. However, if the separate trees for luma and chroma are used, there might be multiple luma blocks corresponding to the current chroma block. For example, in FIG. 3, the corresponding luma block associated with the current chroma block is determined to cover the top-left position (312) of the current chroma block 310. It is important to choose an appropriate block among corresponding luma blocks in terms of coding efficiency. For another example of chroma DM mode, the Intra prediction mode of the corresponding luma block associated with the current chroma block covering the center position (314) of the current chroma 310 block is directly inherited. Therefore, when chroma DM is used for the current chroma block, the corresponding luma block associated with the current chroma block is to cover the center position (314) of the current chroma block 310 as shown in FIG. 3. More details can be found in JVET-L0053 (N. Choi, et al., "CE3-related: Chroma DM modification", Joint Video Experts Team (JVET) of ITU-T SG 16 WP 3 and ISO/IEC JTC 1/SC 29/WG 11, 12th Meeting: Macao, CN, 3-12 Oct. 2018, Document: JVET-L0053) and JVET-L0272 (L. Zhang, K. Zhang, H. Liu, Y Wang, P. Zhao, D. Hong, "CE3-related: Modified chroma derived mode", Joint Video Experts Team (JVET) of ITU-T SG 16 WP 3 and ISO/IEC JTC 1/SC 29/WG 11, 12th Meeting: Macao, CN, 3-12 Oct. 2018, JVET-L0272).

PCM Mode

When a block is coded in Intra mode, pulse code modulation (PCM) mode or Intra mode can be used. In PCM mode, the prediction, transform, quantization and entropy coding are bypassed, and the samples are directly represented by a pre-defined number of bits. Its main purpose is to avoid excessive consumption of bits when the signal characteristics are extremely unusual (e.g., noise-like signals) and cannot be properly handled by hybrid coding.

CIIP (Combined Inter Merge/Intra Prediction) Mode

When a CU is coded in Merge mode, and if the CU contains at least 64 luma samples (i.e., CU width times CU height≥64), an additional flag is signaled to indicate if the combined inter/intra prediction (CIIP) mode is applied to the current CU. In order to form the CIIP prediction, an Intra prediction mode, such as planar mode is used. Then, the Inter prediction (e.g. the merge prediction generated from a merge motion candidate) and Intra prediction signals are derived using regular Intra and Inter decoding processes. Finally, weighted averaging of the Inter and Intra prediction signals is performed to obtain the CIIP prediction. A more detailed description of the algorithm can be found in JVET-L0100 (M.-S. Chiang, et al., "CE10.1.1: Multi-hypothesis prediction for improving AMVP mode, skip or merge mode, and intra mode," 12th Meeting: Macao, Joint Video Experts Team (JVET) of ITU-T SG 16 WP 3 and ISO/IEC JTC 1/SC 29/WG 11, 12th Meeting: Macao, CN, 3-12 Oct. 2018, Document: JVET-L0100) and JVET-N0302 (L. Pham Van, et al., "CE10: CIIP with position-independent weights (Test CE10-1.1)," Joint Video Experts Team (JVET) of ITU-T SG 16 WP 3 and ISO/IEC JTC 1/SC 29/WG 11, 12th Meeting: Macao, CN, 3-12 Oct. 2018, Document: JVET-N0302).

BDPCM

BDPCM (Block Differential Pulse Coded Modulation or Block-based Delta Pulse Code Modulation), which is also called RDPCM (Residual Block-Differential Pulse Coded Modulation), method proposed in JVET-M0057 (F. Henry, et al., "CE8: BDPCM with horizontal/vertical predictor and independently decodable areas (test 8.3.1b)", Joint Video Experts Team (JVET) of ITU-T SG 16 WP 3 and ISO/IEC JTC 1/SC 29/WG 11, 13th Meeting: Marrakech, MA, 9-18 Jan. 2019, Document: JVET-M0057) uses reconstructed samples to predict the rows or columns line by line. VVC supports BDPCM for screen content coding. At the sequence level, a BDPCM enable flag is signalled in the SPS; this flag is signalled only if the transform Skip mode (described in the next section) is enabled in the SPS. When BDPCM is enabled, a flag is signaled at the CU level if the CU size is smaller than or equal to MaxTsSize by MaxTsSize in terms of luma samples and if the CU is intra coded, where MaxTsSize is the maximum block size for which the transform skip mode is allowed. This flag indicates whether regular Intra coding or BDPCM is used. If BDPCM is used, a BDPCM prediction direction flag is signaled to indicate whether the prediction is horizontal or vertical.

Then, the block is predicted using the regular horizontal or vertical Intra prediction process with unfiltered reference samples. The residual is quantized and the difference between each quantized residual and its predictor, i.e. the previously coded residual of the horizontal or vertical (depending on the BDPCM prediction direction) neighbouring position, is coded.

For a block of size M (rows)×N (cols), let $r_{i,j}$, $0 \leq i \leq M-1$, $0 \leq j \leq N-1$ be the prediction residual after performing Intra prediction horizontally (i.e., copying left neighbor pixel value across the predicted block line by line) or vertically (i.e., copying top neighbor line to each line in the predicted block) using unfiltered samples from above or left block boundary samples. Let $Q(r_{i,j})$, $0 \leq i \leq M-1$, $0 \leq j \leq N-1$ denote the quantized version of the residual $r_{i,j}$, where the residual corresponds to the difference between the original block and the predicted block. Then, the BDPCM is applied to the quantized residual samples, resulting in modified M×N array $\tilde{R}$ with elements $\tilde{r}_{i,j}$. When vertical BDPCM (the BDPCM prediction direction referring vertical intra prediction) is used:

$$\tilde{r}_{i,j} = \begin{cases} Q(r_{i,j}), & i = 0, 0 \leq j \leq (N-1) \\ Q(r_{i,j}) - Q(r_{(i-1),j}), & 1 \leq i \leq (M-1), 0 \leq j \leq (N-1) \end{cases}.$$

For horizontal prediction, similar rules apply, and the residual quantized samples are obtained by:

$$\tilde{r}_{i,j} = \begin{cases} Q(r_{i,j}), & 0 \le i \le (M-1), j = 0 \\ Q(r_{i,j}) - Q(r_{i,(j-1)}), & 0 \le i \le (M-1), 1 \le j \le (N-1) \end{cases}.$$

The residual quantized samples $\tilde{r}_{i,j}$ are sent to the decoder.

On the decoder side, the above calculations are reversed to produce $Q(r_{i,j})$, $0 \le i \le M-1$, $0 \le j \le N-1$. For vertical prediction case, $$Q(r_{i,j}) = \sum_{k=0}^{i} \tilde{r}_{k,j}, 0 \le i \le (M-1), 0 \le j \le (N-1).$$

For horizontal case, $$Q(r_{i,j}) = \sum_{k=0}^{j} \tilde{r}_{i,k}, 0 \le i \le (M-1), 0 \le j \le (N-1).$$

The inverse quantized residuals, $Q^{-1}(Q(r_{i,j}))$, are added to the intra block prediction values to produce the reconstructed sample values. The predicted quantized residual values $\tilde{r}_{i,j}$ are sent to the decoder using the same residual coding process as that in transform skip mode residual coding. For lossless coding, if slice_ts_residual_coding_disabled_flag is set to 1, the quantized residual values are sent to the decoder using regular transform residual coding. More details can be found in JVET-N0413 (M. Karczewicz, et al., "CE8-related: Quantized residual BDPCM," Joint Video Experts Team (JVET) of ITU-T SG 16 WP 3 and ISO/IEC JTC 1/SC 29/WG 11, 14th Meeting: Geneva, CH, 19-27 Mar. 2019, Document: JVET-N0413).

BRIEF SUMMARY OF THE INVENTION

A method and apparatus of prediction for video coding are disclosed. According to this method, input data related to a current chroma block in a current picture are received at a video encoder side or a video bitstream corresponding to compressed data including the current chroma block in the current picture is received at a video decoder side. A luma Intra prediction mode is determined for a corresponding luma block collocated with the current chroma block, where a predefined mode is assigned to the luma Intra prediction mode when the corresponding luma block collocated with the current chroma block satisfies one or more conditions. A chroma Intra prediction mode is derived for the current chroma block according to the luma Intra prediction mode for the corresponding luma block collocated with the current chroma block. The current chroma block may correspond to a chroma coding block (CB) and the corresponding luma block corresponds to a luma coding block (CB) or a luma prediction block (PB).

The chroma Intra prediction mode for the current chroma block can be directly inherited from the luma Intra prediction mode of the corresponding luma block collocated with the current chroma block. In one embodiment, the corresponding luma block collocated with the current chroma block covers a center position of the current chroma block.

In one embodiment, the predefined mode corresponds to planar mode or DC mode. In one embodiment, the conditions comprise the corresponding luma block being coded with IBC (Intra Block Copy) mode. In another embodiment, conditions comprise the corresponding luma block being coded with PCM (Pulse Coded Modulation) mode, palette mode, non-Intra mode, RDPCM (Residual Block-DPCM (Differential Pulse Coded Modulation)) mode.

In one embodiment, when the conditions correspond to the corresponding luma block being coded in RDPCM mode, the predefined mode is set to horizontal or vertical mode depending on prediction direction of the RDPCM mode.

In one embodiment, when said one or more conditions correspond to the corresponding luma block being coded in IBC (Intra Block Copy) mode, the predefined mode is set to one of {planar mode, DC mode, horizontal mode, vertical mode}.

In one embodiment, when the conditions correspond to the corresponding luma block being coded in IBC (Intra Block Copy) mode, the predefined mode is set to DC mode.

According to another method, a predefined mode is assigned to Intra prediction mode for the current block when the current block satisfies one or more conditions. The current block or a following coded block is then encoded or decoded according to the Intra prediction mode for the current block and/or the Intra prediction mode can be referenced by the following coded blocks.

In one embodiment, the predefined mode corresponds to planar mode or DC mode. In one embodiment, the conditions comprise the current block being coded with IBC (Intra Block Copy) or palette mode.

DETAILED DESCRIPTION OF THE INVENTION

Figure 1:
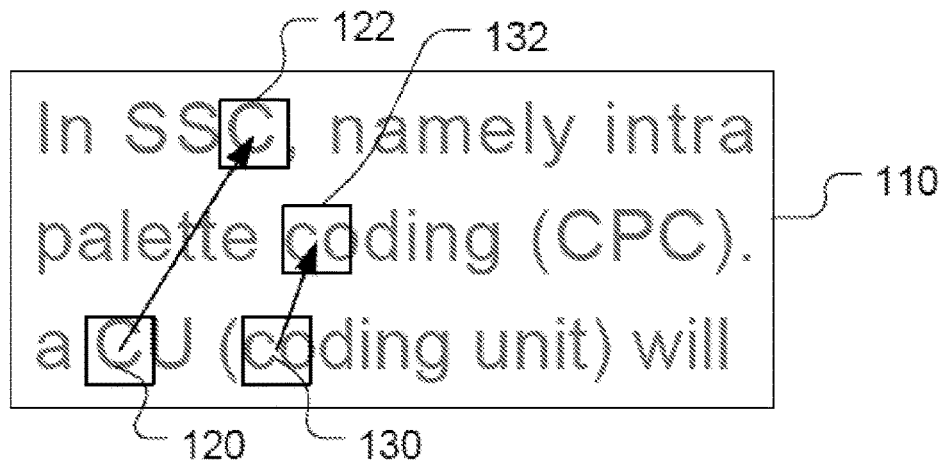
FIG. 1 illustrates an example of CPR (current picture referencing) compensation, where two blocks are predicted by another two blocks in the same picture.
Figure 2:
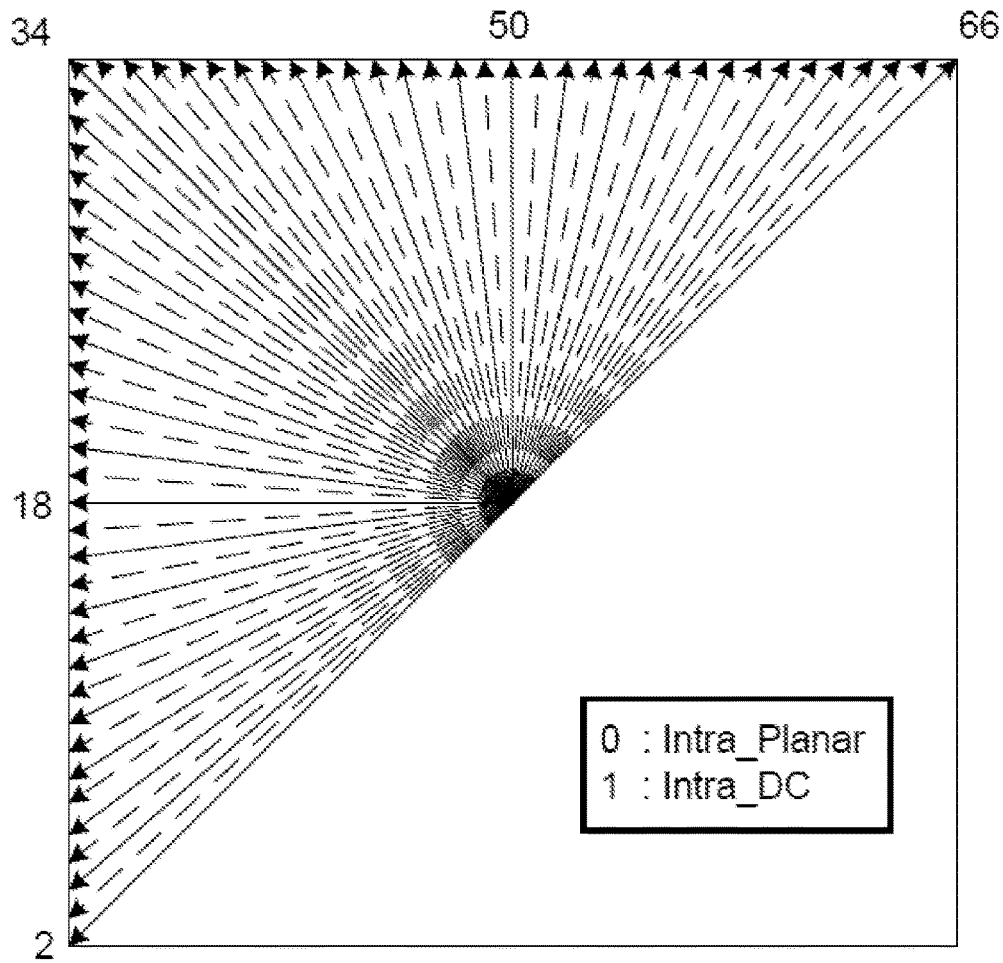
FIG. 2 illustrates the 67 Intra prediction modes including the 65 directional modes, and planar and DC modes, where the new directional modes not in HEVC are depicted as dashed lines.
Figure 3:
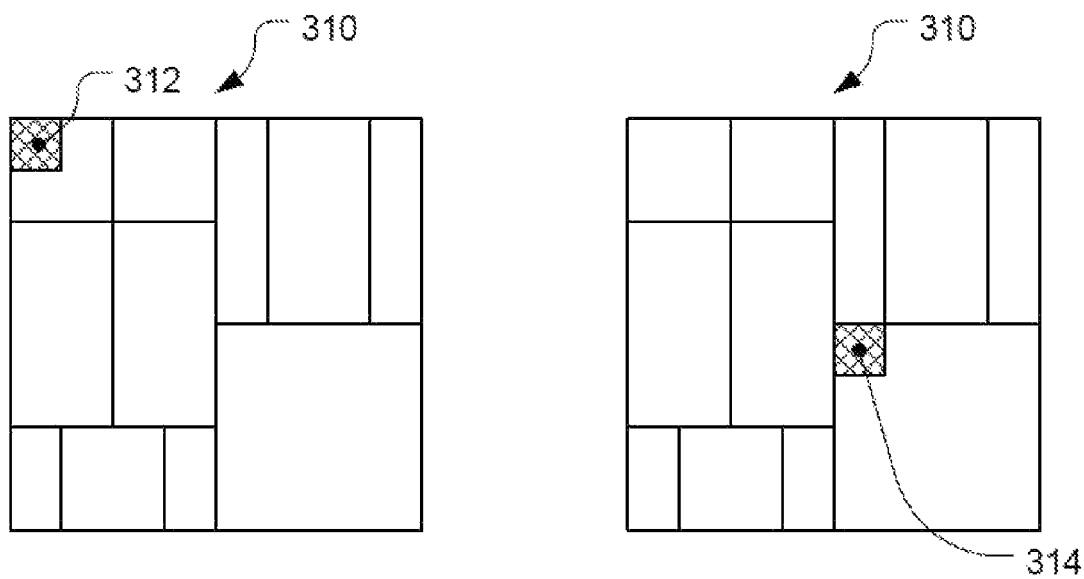
FIG. 3 illustrates two examples of the corresponding luma block associated with the current chroma block.

The following description is of the best-contemplated mode of carrying out the invention. This description is made for the purpose of illustrating the general principles of the invention and should not be taken in a limiting sense. The scope of the invention is best determined by reference to the appended claims.

Any proposed methods in this invention can be controlled or combined with implicit rules or explicit rules. In one embodiment, the implicit rules can depend on the CB (Coding Block)/PB (Prediction Block) width, CB/PB height, and/or CB/PB area. In another embodiment, the explicit rules can depend on a flag signaled at PU, CU, CTU, slice, tile, tile group, SPS (Sequence Parameter Set), and/or PPS (Picture Parameter Set) level.

The Intra Prediction Mode for the Current Chroma Block

The Intra prediction mode for the current chroma block is derived according to the Intra prediction mode for the corresponding luma block associated with the current chroma block. For example, the specification of the Intra prediction mode for the current chroma block depends on the Intra prediction mode for the corresponding luma block associated with the current chroma block. For another example of using chroma DM as the Intra prediction mode for the current chroma block, the Intra prediction mode for the current chroma block is directly inherited from the luma Intra prediction mode of the corresponding luma block collocated with the current chroma block. For another example, Default mode settings or forbidden settings are proposed to apply when determining the Intra prediction mode for the corresponding luma block associated with the current chroma block. The corresponding luma block associated with the current chroma block is same as the current chroma block or different from the current chroma block in the splitting tree. For example, the current chroma block and the corresponding luma block associated with the current chroma block are in different splitting trees. The current chroma block is in a chroma splitting tree and the corresponding luma block associated with the current chroma block is in a luma splitting tree. In this case, when the chroma block is coded with an Intra mode, the corresponding luma block associated with the current chroma block may be coded with a non-Intra mode. The Intra prediction mode for the corresponding luma block associated with the current chroma block is determined based on Default mode settings or forbidden settings.

I. Default Mode Settings

Default mode settings mean that a predefined mode (also named as a default mode in this invention) is assigned to the Intra prediction mode for the corresponding luma block collocated with the current chroma block when the corresponding luma block collocated with the current chroma block satisfies one or more conditions.

In one embodiment, the condition is that the corresponding luma CB/PB collocated with the current chroma CB/PB is coded with IBC mode.

In another embodiment, the condition is that the corresponding luma CB/PB collocated with the current chroma CB/PB is coded with PCM mode.

In another embodiment, the condition is that the corresponding luma CB/PB collocated with the current chroma CB/PB is coded with palette mode.

In another embodiment, the condition is that the corresponding luma CB/PB collocated with the current chroma CB/PB is coded with non-Intra mode, such as IBC mode.

In another embodiment, the condition is that the corresponding luma CB/PB collocated with the current chroma CB/PB is coded with RDPCM mode.

In one embodiment, the default mode is planar mode.

In another embodiment, when the corresponding luma CB/PB collocated with the current chroma CB/PB is coded with RDPCM mode, the default mode can be horizontal or vertical mode depending on the prediction direction (i.e., horizontal or vertical prediction) used for the corresponding luma CB/PB collocated with the current chroma CB/PB coded with RDPCM mode. In one example, if the prediction direction is horizontal, the default mode is set to be horizontal mode. In another sub-embodiment, if the prediction direction is vertical, the default mode is set to be horizontal mode. In another example, if the prediction direction is vertical, the default mode is set to be vertical mode. In another example, if the prediction direction is horizontal, the default mode is set to be vertical mode.

In another embodiment, the default mode is DC mode.

In another embodiment, the default mode is a non-angular mode.

In another embodiment, the default mode is one of {planar mode, DC, horizontal, vertical}.

In another embodiment, the default mode is decided according to the CB/PB width, height, and/or area for current chroma. For example, if the chroma CB/PB width is equal to the chroma CB/PB height, the default mode is a non-angular mode such as planar mode or DC mode. In another example, when the chroma CB/PB long side is larger than the chroma CB/PB short side multiplied by a particular threshold, such as 1, 2, 3, 4, 5, 6, 7, or 8, the default mode is assigned as follows.

If the long side is block width, the default mode is vertical mode.

If the long side is block height, the default mode is horizontal mode.

In another example, if the chroma CB/PB area is larger than a particular threshold, such as 16, 32, 64, 128, 256, 512, or 1024, the default mode is planar mode. In yet another example, if the chroma CB/PB area is smaller than a particular threshold, such as 16, 32, 64, 128, 256, 512, or 1024, the default mode is planar mode. In yet another example, if the chroma CB/PB area is larger than a particular threshold, such as 16, 32, 64, 128, 256, 512, or 1024, the default mode is DC mode. In yet another example, if the chroma CB/PB area is smaller than a particular threshold, such as 16, 32, 64, 128, 256, 512, or 1024, the default mode is DC mode.

II. Forbidden Settings

Forbidden settings mean that the chroma DM mode is skipped for the current chroma block or the corresponding luma block associated with the current chroma block is viewed as invalid for generating the intra prediction mode for the current chroma block when at least one of the following conditions happens.

In one embodiment, the condition is that the corresponding luma CB/PB collocated with the current chroma CB/PB is coded with IBC mode.

In another embodiment, the condition is that the corresponding luma CB/PB collocated with the current chroma CB/PB is coded with PCM mode.

In another embodiment, the condition is that the corresponding luma CB/PB collocated with the current chroma CB/PB is coded with palette mode.

In another embodiment, the condition is that the corresponding luma CB/PB collocated with the current chroma CB/PB is coded with non-Intra mode, such as IBC mode.

In another embodiment, the condition is that the corresponding luma CB/PB collocated with the current chroma CB/PB is coded with RDPCM mode.

Motion Information Modification for IBC Mode

In one embodiment, the values of BVs, BVDs, and/or BVPs are clipped in a pre-defined range. For example, the pre-defined range can be represented by 16 bits. In a sub-embodiment, the pre-defined range is $[-2^{15}, 2^{15}]$. For example, the pre-defined range can be represented by 18 bits, which may be the same as regular inter. In a sub-embodiment, the pre-defined range is $[-2^{17}, 2^{17}]$.

In another embodiment, BVs, BVDs, and/or BVPs can be stored in the integer-pel precision and can be referenced by the following coded block.

In another embodiment, BVs, BVDs, and/or BVPs can be stored in the ¼-pel precision and can be referenced by the following coded block.

In another embodiment, BVs, BVDs, and/or BVPs can be stored in the ¹⁄₁₆-pel precision and can be referenced by the following coded block.

Intra Prediction Mode for IBC/PCM/Palette Mode

In one embodiment, the Intra prediction mode for IBC/PCM/palette mode is set to be one of {planar, DC, horizontal, vertical}.

In another embodiment, the Intra prediction mode for IBC/PCM/palette mode is decided based on the current block width, height, and/or area. For example, if the current block width is equal to the current block height, the intra prediction mode is a non-angular mode such as planar mode or DC mode. In another example, when the current block long side is larger than the current block short side multiplied by a particular threshold, such as 1, 2, 3, 4, 5, 6, 7, or 8, the intra prediction mode is assigned as follows.

If the long side is block width, the intra prediction mode is vertical mode.

If the long side is block height, the intra prediction mode e is horizontal mode.

In another example, if the current block area is larger than a particular threshold, such as 16, 32, 64, 128, 256, 512, or 1024, the Intra prediction mode is planar mode. In another example, if the current block area is smaller than a particular threshold, such as 16, 32, 64, 128, 256, 512, or 1024, the Intra prediction mode is planar mode. In another example, if the current block area is larger than a particular threshold, such as 16, 32, 64, 128, 256, 512, or 1024, the Intra prediction mode is DC mode. In another example, if the current block area is smaller than a particular threshold, such as 16, 32, 64, 128, 256, 512, or 1024, the Intra prediction mode is DC mode.

In another embodiment, the Intra prediction mode for IBC/PCM/palette can be referenced by the following coded blocks or used in the following process in some conditions. For example, the condition is when deriving the Intra prediction mode for the following coded chroma CB/PB or using chroma DM for the following chroma CB/PB, the corresponding luma CB/PB associated with the following chroma CB/PB is coded with IBC/PCM/palette mode. For another example, the condition is that the Intra prediction mode for RDPCM is used in Intra prediction generation or transform process.

Intra Prediction Mode for RDPCM Mode

In one embodiment, the Intra prediction mode for RDPCM mode is set to be one of {planar, DC, horizontal, vertical}.

In another embodiment, the Intra prediction mode for RDPCM mode can be horizontal or vertical mode depending on the prediction direction (i.e., horizontal or vertical prediction). For example, if the prediction direction is horizontal, the Intra prediction mode for RDPCM mode is set to be horizontal mode. In another example, if the prediction direction is vertical, the Intra prediction mode for RDPCM mode is set to be horizontal mode. In yet another example, if the prediction direction is vertical, the Intra prediction mode for RDPCM mode is set to be vertical mode. In yet another example, if the prediction direction is horizontal, the Intra prediction mode for RDPCM mode is set to be vertical mode.

In another embodiment, the Intra prediction mode for RDPCM mode is decided based on the current block width, height, and/or area for. For example, if the current block width is equal to the current block height, the Intra prediction mode is a non-angular mode such as planar mode or DC mode. In another example, when the current block long side is larger than the current block short side multiplied by a particular threshold, such as 1, 2, 3, 4, 5, 6, 7, or 8, the Intra prediction mode is assigned as follows.

If the long side is block width, the Intra prediction mode is vertical mode.

If the long side is block height, the Intra prediction mode is horizontal mode.

In another example, if the current block area is larger than a particular threshold, such as 16, 32, 64, 128, 256, 512, or 1024, the Intra prediction mode is planar mode. In another example, if the current block area is smaller than a particular threshold, such as 16, 32, 64, 128, 256, 512, or 1024, the intra prediction mode is planar mode. In another example, if the current block area is larger than a particular threshold, such as 16, 32, 64, 128, 256, 512, or 1024, the Intra prediction mode is DC mode. In another example, if the current block area is smaller than a particular threshold, such as 16, 32, 64, 128, 256, 512, or 1024, the Intra prediction mode is DC mode.

In another embodiment, the Intra prediction mode for RDPCM can be referenced by the following coded blocks or used in the following process in some conditions. For example, the condition is that when deriving the Intra prediction mode for the following coded chroma CB/PB or using chroma DM for the following chroma CB/PB, the corresponding luma CB/PB associated with the following chroma CB/PB is coded with RDPCM mode. For another example, the condition is that the Intra prediction mode for RDPCM is used in not only Intra prediction generation but also transform process.

Any combinations of above methods can be applied.

Any of the foregoing proposed methods can be implemented in encoders and/or decoders. For example, any of the proposed methods can be implemented in IBC/intra/PCM/inter/RDPCM coding of an encoder, and/or a decoder. Alternatively, any of the proposed methods can be implemented as a circuit coupled to the IBC/intra/PCM/inter/RDPCM coding of the encoder and/or the decoder, so as to provide the information needed by the IBC/intra/PCM/inter/RDPCM coding.

Figure 4:
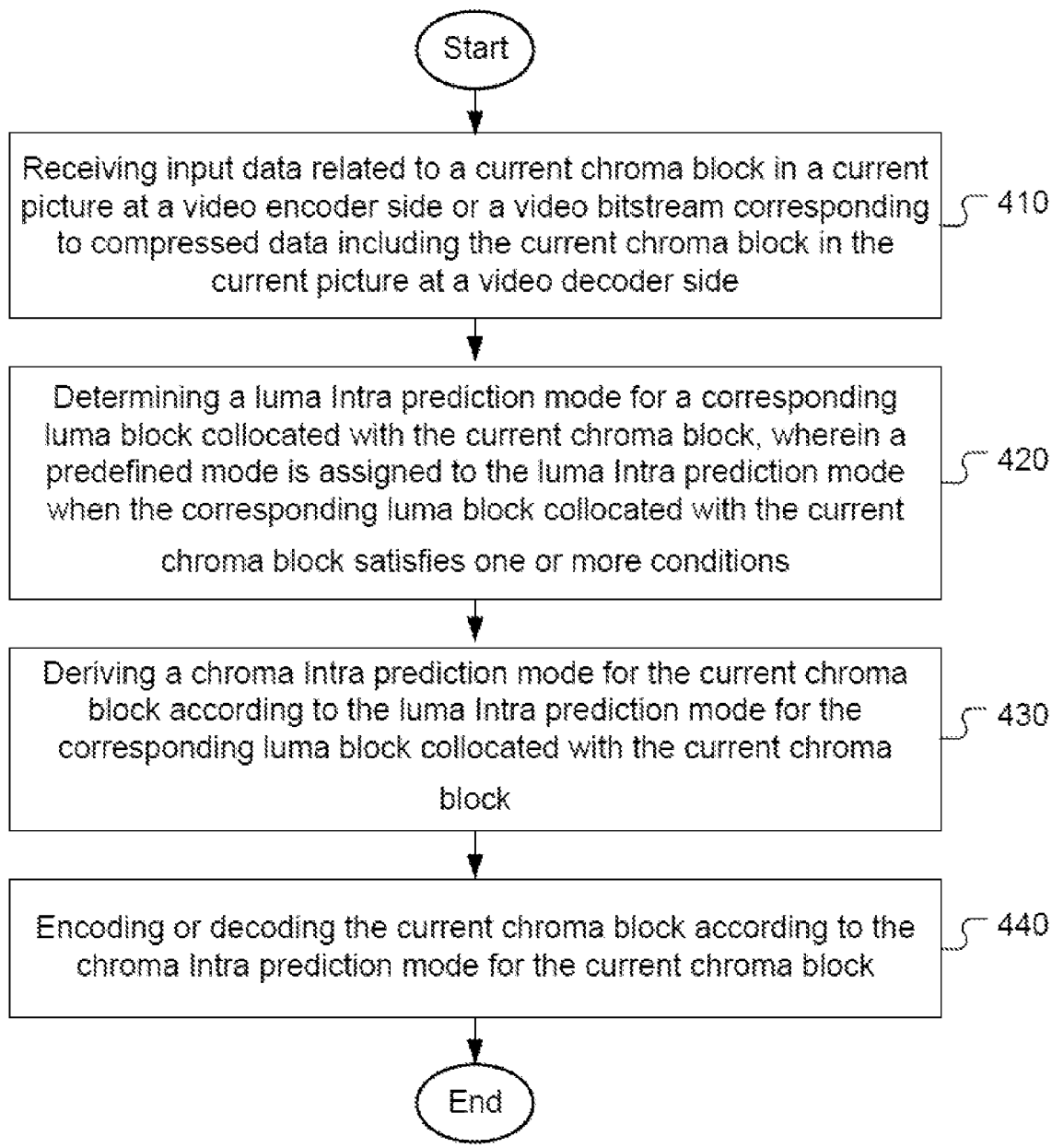
FIG. 4 illustrates a flowchart of an exemplary video coding deriving the intra prediction mode for the current chroma block based on the intra prediction mode for the corresponding luma block associated with the current chroma block according to an embodiment of the present invention, where a pre-defined Intra mode is assigned to the intra prediction mode for the corresponding luma block associated with the current chroma block when a corresponding luma block collocated with the current chroma block satisfies one or more conditions.

FIG. 4 illustrates a flowchart of an exemplary video coding deriving the Intra prediction mode for the current chroma block according to the Intra prediction mode for the corresponding luma block associated with the current chroma block (e.g. using chroma DM (Direct Mode) mode for the current chroma block) according to an embodiment of the present invention, where a default Intra mode is assigned to the intra prediction mode for the corresponding luma block associated with the current chroma block when a corresponding luma block collocated with the current chroma block satisfies one or more conditions. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, input data related to a current chroma block in a current picture are received at a video encoder side or a video bitstream corresponding to compressed data including the current chroma block in the current picture is received at a video decoder side in step 410. A luma Intra prediction mode is determined for a corresponding luma block collocated with the current chroma block in step 420, where a predefined mode is assigned to the luma Intra prediction mode when the corresponding luma block collocated with the current chroma block satisfies one or more conditions. A chroma Intra prediction mode is derived for the current chroma block according to the luma Intra prediction mode for the corresponding luma block collocated with the current chroma block in step 430. In step 440, the current chroma block is encoded or decoded according to the chroma Intra prediction mode for the current chroma block.

Figure 5:
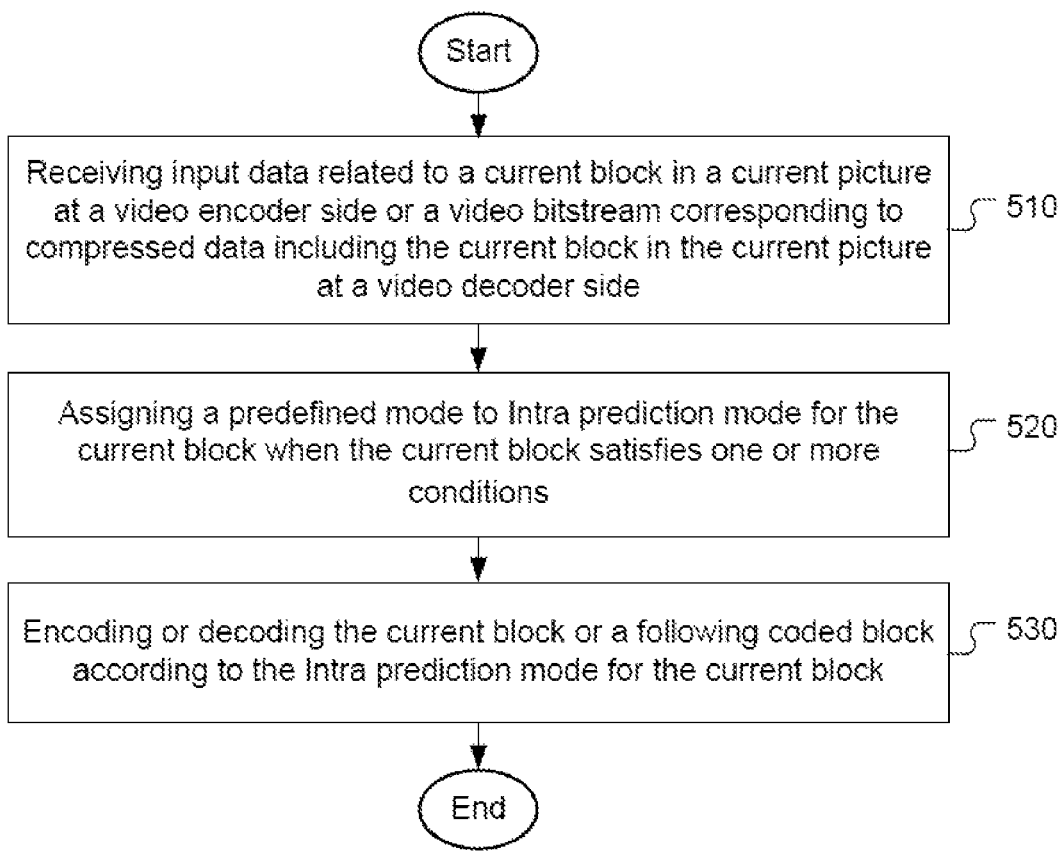
FIG. 5 illustrates a flowchart of an exemplary video coding according to an embodiment of the present invention, where the current block is coded with IBC (Intra Block Copy), BDPCM, or palette mode.

FIG. 5 illustrates a flowchart of an exemplary video coding according to an embodiment of the present invention. According to this method, input data related to a current block in a current picture are received at a video encoder side or a video bitstream corresponding to compressed data including the current block in the current picture is received at a video decoder side in step 510. A predefined mode is assigned to Intra prediction mode for the current block when the current block satisfies one or more conditions in step 520. The conditions include the current block is coded with IBC (Intra Block Copy), BDPCM, or palette mode. In step 530, the current block or the following coded block is encoded or decoded according to the Intra prediction mode for the current block.

The flowcharts shown are intended to illustrate examples of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding, the method comprising:
   receiving input data related to a current chroma block in a current picture at a video encoder side or a video bitstream corresponding to compressed data including the current chroma block in the current picture at a video decoder side;
   determining a luma Intra prediction mode for a corresponding luma block collocated with the current chroma block, wherein a predefined mode corresponding to planar mode or DC mode is assigned to the luma Intra prediction mode when the corresponding luma block collocated with the current chroma block is coded with IBC (Intra Block Copy) mode when the current chroma block is in a chroma splitting tree and the corresponding luma block collocated with the current chroma block is in a luma splitting tree;
   deriving a chroma Intra prediction mode for the current chroma block according to the luma Intra prediction mode for the corresponding luma block collocated with the current chroma block; and
   encoding or decoding the current chroma block according to the chroma Intra prediction mode for the current chroma block.

2. The method of claim 1, wherein the current chroma block corresponds to a chroma coding block (CB) and the corresponding luma block corresponds to a luma coding block (CB) or a luma prediction block (PB).

3. The method of claim 1, wherein the chroma Intra prediction mode for the current chroma block is directly inherited from the luma Intra prediction mode of the corresponding luma block collocated with the current chroma block.

4. The method of claim 3, wherein the corresponding luma block collocated with the current chroma block covers a center position of the current chroma block.

5. An apparatus of video coding, the apparatus of video coding comprising one or more electronic circuits or processors arranged to:
   receive input data related to a current chroma block in a current picture at a video encoder side or a video bitstream corresponding to compressed data including the current chroma block in the current picture at a video decoder side;
   determine a luma Intra prediction mode for a corresponding luma block collocated with the current chroma block, wherein a predefined mode corresponding to planar mode or DC mode is assigned to the luma Intra prediction mode when the corresponding luma block collocated with the current chroma block is coded with IBC (Intra Block Copy) mode when the current chroma block is in a chroma splitting tree and the corresponding luma block collocated with the current chroma block is in a luma splitting tree;

deriving a chroma Intra prediction mode for the current chroma block according to the luma Intra prediction mode for the corresponding luma block collocated with the current chroma block; and encode or decode the current chroma block according to the chroma Intra prediction mode for the current chroma block.

* * * * *